United States Patent
Hasegawa et al.

(10) Patent No.: US 6,823,747 B2
(45) Date of Patent: Nov. 30, 2004

(54) CAPACITIVE SENSOR

(75) Inventors: Kazuo Hasegawa, Miyagi-ken (JP);
Katsuyuki Ishiguro, Miyagi-ken (JP);
Yasuichi Ono, Miyagi-ken (JP); Daiichi Hashimoto, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/376,751

(22) Filed: Feb. 28, 2003

(65) Prior Publication Data

US 2003/0169056 A1 Sep. 11, 2003

(30) Foreign Application Priority Data

Mar. 7, 2002 (JP) .......................... 2002-062733
Jul. 31, 2002 (JP) .......................... 2002-223607

(51) Int. Cl.⁷ .............................. G01L 1/26; G01L 1/12; G01B 7/17
(52) U.S. Cl. ............................ 73/862.52; 73/862.626; 73/780
(58) Field of Search ......................... 73/862.043, 780, 73/862.337, 862.52, 862.626

(56) References Cited

U.S. PATENT DOCUMENTS

| | | | | |
|---|---|---|---|---|
| 4,747,313 A | * | 5/1988 | Okada | 73/862.043 |
| 5,421,213 A | * | 6/1995 | Okada | 73/862.043 |
| 5,437,196 A | * | 8/1995 | Okada | 73/862.043 |
| 5,668,318 A | * | 9/1997 | Okada | 73/504.11 |
| 5,786,997 A | * | 7/1998 | Hoyt et al. | 73/862.043 |
| 6,185,814 B1 | * | 2/2001 | Okada | 73/862.043 |
| 6,508,137 B2 | * | 1/2003 | Suzuki | 73/862.043 |

* cited by examiner

Primary Examiner—Edward Lefkowitz
Assistant Examiner—Lilybett Martir
(74) Attorney, Agent, or Firm—Beyer Weaver & Thomas LLP

(57) ABSTRACT

A capacitive sensor includes a retaining member, an intermediate member retained by the retaining member such that the intermediate member can rotate around a first axis, a movable member retained by the intermediate member such that the movable member can rotate around a second axis which is perpendicular to the first axis, a weight provided on the movable member, a movable electrode unit consisting of one or more electrodes which is provided on the movable member, and a board on which a fixed electrode unit consisting of one or more electrodes is provided such that the fixed electrode unit faces the movable electrode unit. At least one of the movable electrode unit and the fixed electrode unit includes a plurality of electrodes, and capacitances between the one or more electrodes of the movable electrode unit and the one or more electrodes of the fixed electrode unit are detected.

13 Claims, 13 Drawing Sheets

CAPACITIVE SENSOR

BACKGROUND OF THE INVENTION

1. Field of the Invention

The present invention relates to capacitive sensors, and more specifically relates to a structure suitable for detecting displacements around two axes on the basis of capacitances.

2. Description of the Related Art

With respect to capacitive sensors which use a capacitance change, tilt sensors for detecting a tilt are known in the art.

A typical tilt sensor includes a pair of electrodes which face each other, one of the electrodes being formed on a fixed plate and the other one being formed on a flexible plate. A weight is attached to the flexible plate, and when the sensor tilts, the flexible plate is deformed due to the weight so that the capacitance between the above-described electrodes changes. The tilt is detected by determining the capacitance change.

However, in the above-described construction in which the elastic distortion of the flexible plate is used, the flexible plate can be moved only slightly and the capacitance cannot be changed by a large amount. Accordingly, sufficient sensor sensitivity cannot be obtained, and the application of the sensor is limited.

SUMMARY OF THE INVENTION

In view of the above-described situation, an object of the present invention is to provide a capacitive sensor in which a capacitance changes by a large amount.

In order to attain this object, a capacitive sensor according to the present invention includes a retaining member; an intermediate member retained by the retaining member such that the intermediate member can rotate around a first axis; a movable member retained by the intermediate member such that the movable member can rotate around a second axis which is perpendicular to the first axis; a weight provided on the movable member; a movable electrode unit consisting of one or more electrodes which is provided on the movable member; and a board on which a fixed electrode unit consisting of one or more electrodes is provided such that the fixed electrode unit faces the movable electrode unit. At least one of the movable electrode unit and the fixed electrode unit includes a plurality of electrodes, and the rotation of the movable member is detected on the basis of capacitances between the one or more electrodes of the movable electrode unit and the one or more electrodes of the fixed electrode unit change in accordance with the movement of the movable member.

Accordingly, the movable member can rotate around the fist axis and the second axis independently due to the retaining member and the intermediate member. Thus, the movable member can easily rotate and the displacement of the movable electrode unit with respect to the fixed electrode unit due to the rotation can be increased, so that the tilt, etc., around two axes can be detected with high sensitivity.

Preferably, the retaining member and the intermediate member are connected to each other with a pair of first connecting members which extend along the first axis, the intermediate member and the movable member are connected to each other with a pair of second connecting members which extend along the second axis, and the retaining member, the intermediate member, the movable member, the first connecting members, and the second connecting members are integrally formed of a flexible plate.

According to this construction, the retaining member, the intermediate member, the movable member, the first connecting members, and the second connecting members can be manufactured by simply forming slits in a single plate. Thus, the above-described members can be easily manufactured and manufacturing accuracy can be increased.

The retaining member and the intermediate member may be separated from each other with first slits which are arranged at positions excluding the positions where the first connecting members are disposed, and notch portions may be formed in the retaining member at both ends of the first slits. In such a case, the lengths of the first connecting members are increased due to the notch portions formed in the retaining member at the ends of the first slits, so that the intermediate member can more easily rotate around the first axis. In addition, permanent deformation does not easily occur even when an undesirable external force is applied and the first connecting members are twisted by a large amount. In particular, in the case in which the notch portions are formed only in the restraining member so that the width of the intermediate member is not partially reduced, torsional deformation can be uniformly distributed over the entire area of the intermediate member, and plastic deformation of the intermediate member due to stress concentration can be prevented.

In addition, the intermediate member and the movable member may be separated from each other with second slits which are arranged at positions excluding the positions where the second connecting members are disposed, and notch portions may be formed in the movable member at both ends of the second slits. In such a case, the lengths of the second connecting members are increased due to the notch portions formed in the movable member at the ends of the second slits, so that the movable member can rotate more easily. In addition, permanent deformation does not easily occur even when an undesirable external force is applied and the second connecting members are twisted by a large amount. In particular, in the case in which the notch portions are formed only in the movable member so that the width of the intermediate member is not partially reduced, torsional deformation can be uniformly distributed over the entire area of the intermediate member, and plastic deformation of the intermediate member due to stress concentration can be prevented.

The movable member may be composed of a conductive material, and the movable electrode unit may be integrated with the movable member. In such a case, it is not necessary to form the movable electrode unit separately and the number of manufacturing processes can be reduced, so that the costs can be reduced.

In addition, the movable member may have a plurality of holes at positions close to a bonding area between the weight and the movable member in the peripheral region of the bonding area. In such a case, when the weight is bonded to the movable member by, for example, crimping or welding, distortion of the plate which occurs in the bonding process can be reduced by the holes formed at positions close to the bonding area in the peripheral region of the bonding area.

The capacitive sensor according to the present invention may further include a gap-maintaining means which maintains a gap between the fixed electrode unit and the movable electrode unit. In such a case, the gap between the electrode units can be maintained constant and the detection accuracy can be improved.

The gap-maintaining unit may include a retaining projection which retains the movable member above the board such that the movable member can rotate. In such a case, the movable member is prevented from being deflected toward the substrate. Thus, the tilt of the sensor, etc., can be calculated without taking the vertical displacement of the movable member due to the weight of the weight into account, so that the calculation can be simplified. Alternatively, the gap-maintaining unit may include a plate which surrounds the fixed electrode unit.

In addition, the gap-maintaining unit may include a conductive member through which an electric signal is supplied to the movable electrode unit. In such a case, it is not necessary to provide an additional electric line for supplying the electric signal. Accordingly, the parasitic capacitance of such an electric line is not generated, so that the detection accuracy can be improved.

The capacitive sensor may further include a conductive cover which is grounded and which covers at least the weight, the movable member, and the fixed electrode unit. In such a case, the influence of external noise, etc., can be eliminated.

The shape of the cover is preferably symmetric about a line which extends perpendicularly to the movable electrode unit and passes through the center of the movable electrode unit. In such a case, an initial offset capacitance is not generated and the detection accuracy can be improved.

The capacitive sensor may further include a packing which is disposed between the cover and the board. In such a case, foreign matter, flux, moisture, etc., can be prevented from flowing to the inner region of the cover.

DESCRIPTION OF THE PREFERRED EMBODIMENTS

Figure 1:
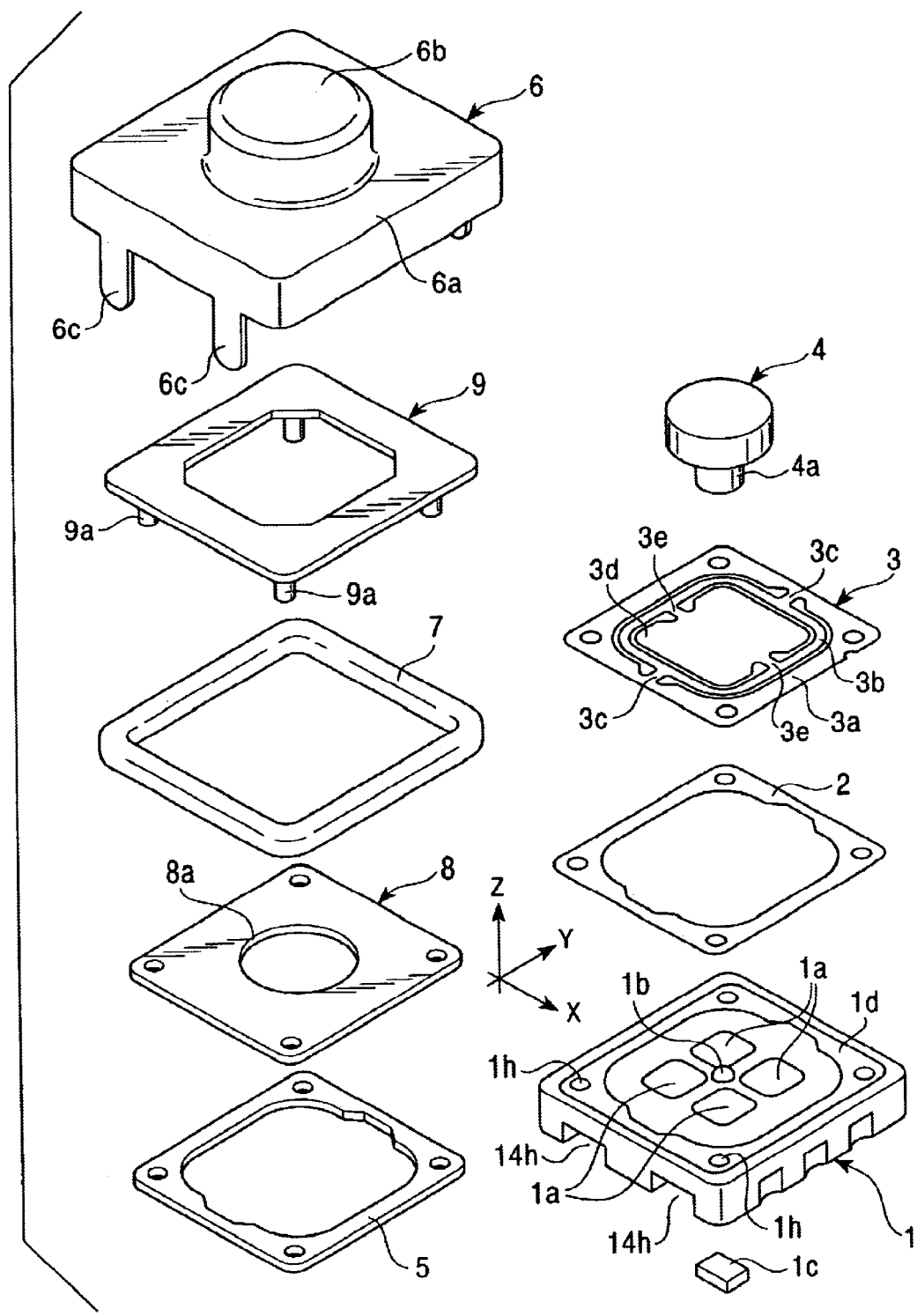
FIG. 1 is an exploded perspective view showing the overall construction of a capacitive sensor according to a first embodiment of the present invention.
Figure 2:
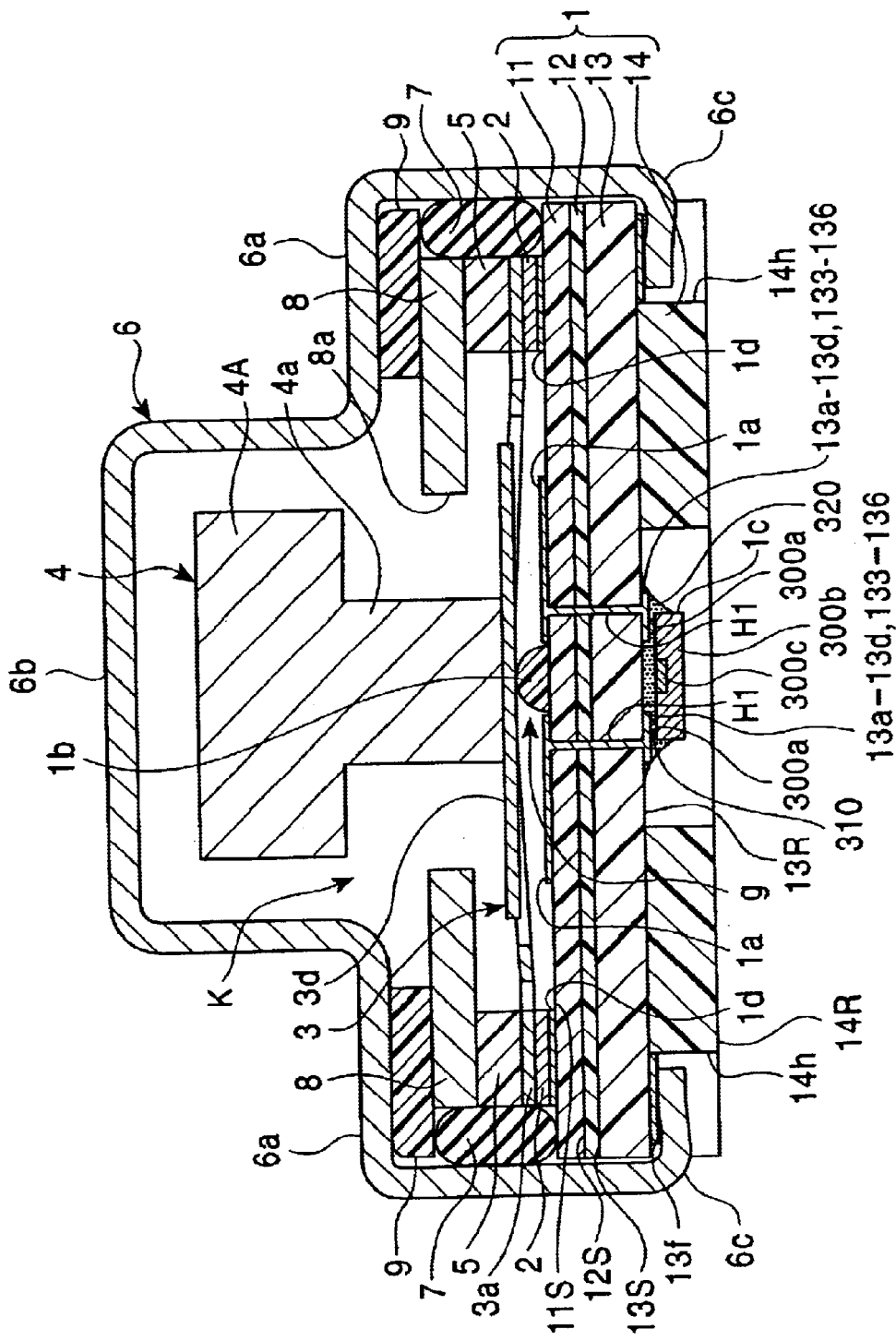
FIG. 2 is a schematic sectional view showing the overall construction of the capacitive sensor according to the first embodiment of the present invention.
Figure 3:
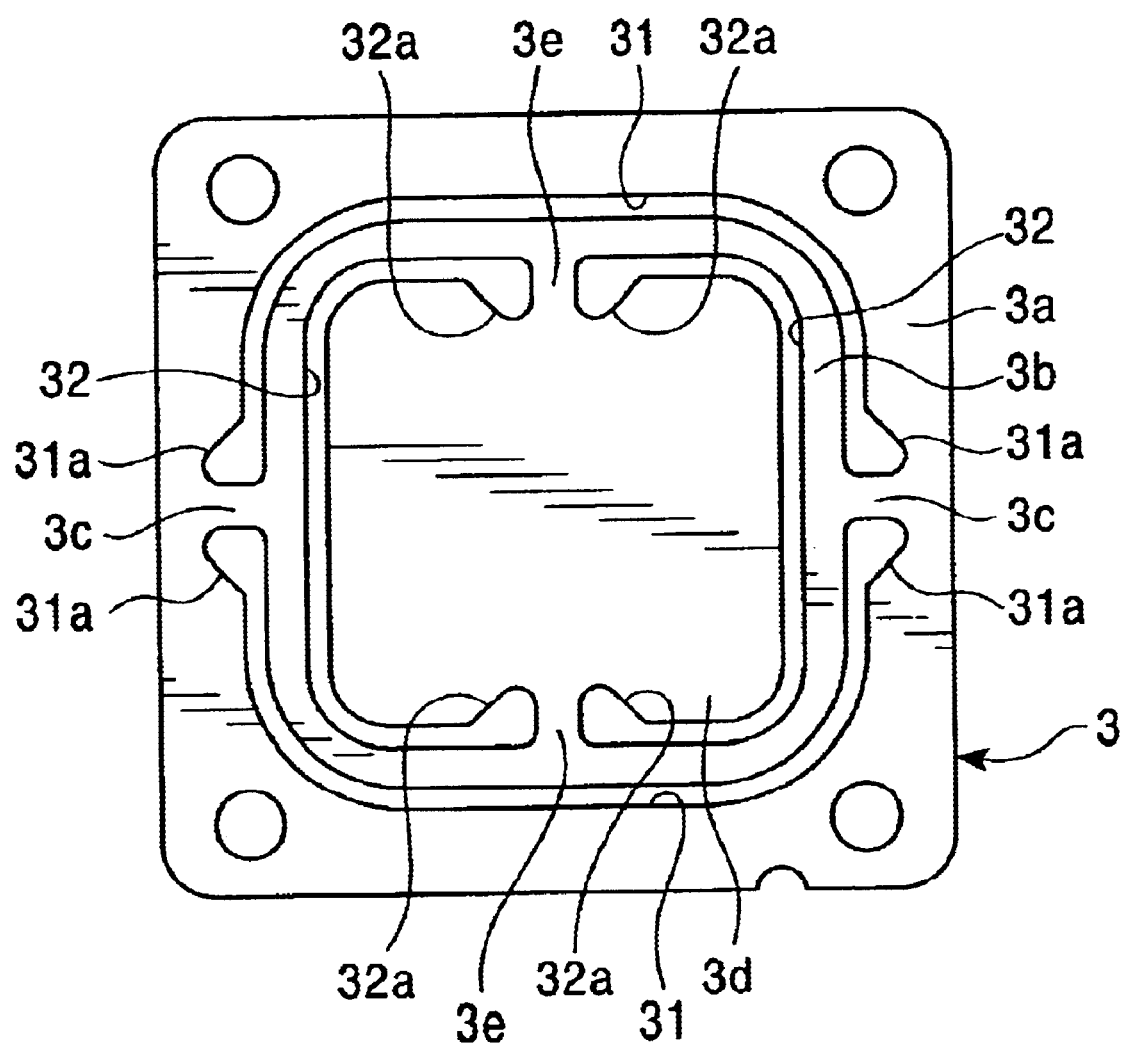
FIG. 3 is an enlarged plan view showing the construction of a retaining plate included in the capacitive sensor according to the first embodiment of the present invention.

A capacitive sensor according to a first embodiment of the present invention will be described below with reference to FIGS. 1 to 8. FIG. 1 is an exploded perspective view of the sensor according to the present embodiment, FIG. 2 is a schematic sectional view showing the overall construction of the sensor, FIG. 3 is an enlarged view of a retaining plate, which is a main component of the sensor, and FIGS. 4 to 8 are diagrams showing plates included in the sensor. In each drawing, dimensional ratios, such as thickness ratios, between the components are shown differently from the actual ratios in order to increase visibility.

With reference to FIG. 2, the capacitive sensor according to the present embodiment includes a detector unit K for detecting electrical signals on a top surface 11S of a board 1 and a processing circuit 1c which processes the electrical signals detected by the detector unit K on a bottom surface 13R of the board 1. In the present embodiment, the detector unit K is constructed as a capacitive tilt detector which detects the tilt of the sensor as capacitance changes, and includes a plurality of electrodes 1a for capacitance detection which are formed on the top surface 11S of the board 1, a retaining plate 3 which faces the electrodes 1a, and a weight 4 which serves to twist the retaining plate 3.

The main body of the board 1 is constructed of a resin laminate composed of ceramic material or epoxy resin. A plurality of electrodes (fixed electrodes) 1a are arranged on the surface of the board 1 in a matrix pattern (four electrodes are provided in FIG. 1), and a frame-shaped electrode 1d is disposed at the peripheral region of the board 1 in such a manner that the electrode 1d surrounds the four electrodes 1a. Since four electrodes 1a are provided, when the entire body tilts in a certain direction, the distance between the retaining plate 3 and one of the electrodes 1a increases (that is, the capacitance therebetween decreases) while the distance between the retaining plate 3 and the electrode 1a which opposes the above electrode 1a in a plan view decreases (that is, the capacitance therebetween increases). Accordingly, the direction and amount of tilt can be determined on the basis of a differential signal between them.

The electrodes 1a and 1d are electrically connected to the processing circuit 1c with through-hole electrodes H1 and H2, respectively, which penetrate through the board 1 in the thickness direction thereof.

A convex portion (retaining projection) 1b is provided on the board 1 at the central position thereof. A conductive spacer (gap-maintaining unit) 2 which extends along the outer periphery of the board 1 is disposed on the electrode (fixed electrode) 1d. The spacer 2 and the convex portion 1b serve to maintain a constant gap between the retaining plate 3 having a gimbal structure, which will be described below, and the board 1, and thereby ensure a space in which a part of the retaining plate 3 can rotate. In addition, the spacer 2 serves to electrically connect the processing circuit 1c and a mounting portion 3d.

The retaining plate 3 is flexible, and is disposed on the spacer 2. The retaining plate 3 is constructed of, for example, a thin metal plate which is composed of a stainless steel or the like and which has the thickness of about 50 $\mu$m. In addition, the retaining plate 3 includes a retaining portion 3a at the peripheral region thereof, and is retained by being adhered to the spacer 2. As shown in FIG. 3, the retaining portion 3a is shaped approximately like a rectangular frame, and first axial portions (first connecting members) 3c are formed such that they extend inward from the inner periphery of the retaining portion 3a at the centers of two opposing sides thereof. The inner ends of the first axial portions 3c are connected to an intermediate portion 3b. The intermediate portion 3b can rotate around the axial line of the first axial portions 3c when the sensor tilts and the first axial portions 3c are twisted.

The intermediate portion 3b is also shaped approximately like a rectangular frame, and second axial portions (second connecting members) 3e are formed such that they extend perpendicularly to the first axial portions 3c from the inner periphery of the intermediate portion 3b at positions such that they oppose each other. The inner ends of the second axial portions 3e are connected to the mounting portion (movable member) 3d. The mounting portion 3d can rotate around the axial line of the second axial portions 3e when the second axial portions 3e are twisted, and can also rotate around the axial line of the first axial portions 3c when the intermediate portion 3b rotates around the axial line of the first axial portions 3c.

In the retaining plate 3 of the present embodiment, all of the retaining portion 3a, the intermediate portion 3b, the first axial portions 3c, the mounting portion 3d, and the second axial portions 3e are formed by cutting long holes (slits) in a single metal plate. Accordingly, they can be easily formed with high accuracy. More specifically, the retaining portion 3a and the intermediate portion 3b are separated from each other by first slits 31 which have an approximate 'U' shape in a plan view and which are arranged at positions excluding the positions where the first axial portions 3c are formed. In addition, the intermediate portion 3b and the mounting portion 3d are separated from each other by second slits 32 which have an approximate 'U' shape in a plan view and which are arranged at positions excluding the positions where the second axial portions 3e are formed. Since the mounting portion 3d is constructed of a metal plate, it serves not only as a movable member but also as a movable electrode according to the present invention.

In the retaining plate 3, in order to prevent plastic deformation of the axial portions 3c and 3e due to the twist, notch portions 31a and 32a are formed in the retaining portion 3a and the mounting portion 3d, respectively, at both ends of the slits 31 and 32, respectively, so that the lengths of the axial portions 3c and 3e are sufficiently increased to prevent the plastic deformation thereof. The notch portions 31a and 32a are not formed in the intermediate portion 3b, so that the axial portions 3c and 3c extend only into the retaining portion 3a and the mounting portion 3d, respectively.

If the notch portions 31a and 32a are formed in the intermediate portion 3b, the width of the intermediate portion 3b is reduced at some parts thereof. Thus, there is a risk that stress will be concentrated at thin parts of the intermediate portion 3b and plastic deformation of the intermediate portion 3b will occur. The stress concentration easily occurs at parts of the intermediate portion 3b where the width thereof is locally reduced. Therefore, the notch portions are not formed in the intermediate portion 3b so that the intermediate portion 3b has an approximately constant width and torsional force is distributed over the entire area of the intermediate portion 3b.

A weight 4 is mounted on the mounting portion 3d at the side opposite to the board 1 by, for example, adhesive bonding, electric welding, laser spot welding, crimping, etc., at the central region of the mounting portion 3d. The gravity center of the weight 4 is separated from both the axial line of the first axial portions 3c and that of the second axial portions 3e in the vertical direction (that is, the gravity center of the weight 4 is at a position higher than that of the retaining plate 3). Therefore, when the sensor is tilted, a moment is applied around one or both of the axial lines in accordance with the direction of tilt. Accordingly, the first axial portions 3c and/or the second axial portions 3e are twisted, and the distances between the mounting portion 3d and the four electrodes 1a change.

As shown in FIG. 2, the weight 4 has a 'T' shape in cross section and includes a head portion (upper portion) 4A, which is the main body, and a bottom portion (lower portion) 4a which is thinner than the head portion 4A. Thus, the gravity center of the weight 4 is at a higher position compared to the case in which the bottom portion 4a and the head portion 4A has the same thickness. Accordingly, when the weight of the weight 4 is constant, the moment, which is determined on the basis of the weight of the weight 4 and the position of the gravity center, can be increased and the sensitivity to tilt can be increased accordingly.

The above-described convex portion (gap-maintaining unit) 1b abuts against the bottom surface of the mounting portion 3d, and maintains a constant gap g between the mounting portion 3d and the electrodes 1a. In addition, the convex portion 1b serves to cancel the influence of downward translational accelerations such as gravity. More specifically, if the convex portion 1b is not provided, the mounting portion 3d is slightly deflected toward the board 1 due to the weight of the weight 4, and the capacitances between the mounting portion 3d which serves as a movable electrode and the electrodes 1a include offsets corresponding to the capacitance increase caused by the deflection of the mounting portion 3d. The offset capacitances are large when the amount of tilt of the sensor is small, and are small when the sensor is in an approximately vertical position since the amount of deflection of the mounting portion 3d decreases.

In such a case, the capacitances do not change linearly with respect to the moment applied by the weight 4, and when the tilt angle of the sensor is determined on the basis of the capacitances, calculations to compensate for the vertical displacement of the mounting portion 3d due to the deflection thereof must be performed. Accordingly, in the present embodiment, the deflection of the mounting portion 3d is prevented by providing the convex portion 1b which supports the mounting portion 3d at the bottom surface thereof, so that the capacitances change linearly with respect to the moment applied and the calculation can be simplified.

In addition, the first axial portions 3c and the second axial portions 3e do not directly receive the weight of the weight 4 unless the sensor is tilted by an extremely large amount. Accordingly, permanent deformation of the first axial portions 3c and the second axial portions 3e does not easily occur even when the widths thereof are reduced relative to the weight of the weight 4. Therefore, the widths of the axial portions 3c and 3e can be reduced without reducing the impact resistance. Since the rigidities of the axial portions 3c and 3e decrease along with the widths thereof, they are greatly deformed when the sensor is tilted and the moment is applied. Accordingly, the detection can be performed with high accuracy.

The height of the convex portion 1b is slightly greater than the total thickness of the spacer 2 on which the retaining portion 3a is disposed and the electrode 1d (in other words, the total thickness of the spacer 2 and the electrode 1d is slightly less than the height of the convex portion 1b). Accordingly, the mounting portion 3d is farther from the board 1 than the retaining portion 3a is, and is biased in a direction away from the board 1 by the convex portion 1b. Since the biasing force is determined on the basis of the difference between the height of the convex portion 1b and the thickness of the spacer 2, when the gap size is set by adjusting the height of the convex portion 1b, the biasing force can be optimally set by adjusting the thickness of the spacer 2.

A frame-shaped fixing plate 5 composed of an insulating material is disposed on the retaining portion 3a, and the thin retaining plate 3 is fixed by being uniformly pushed against the spacer 2 by the fixing plate 5. In addition, a stopper 8 which serves as a rotation-restricting unit for restricting the excessive deflection of the retaining plate 3 is disposed on the fixing plate 5. The stopper 8 is constructed as a flat plate which is thicker and more rigid than the retaining plate 3, and is disposed such that the stopper 8 faces the retaining plate 3 with a gap therebetween, the gap being accurately set by the fixing plate 5. When an undesirable external force is applied to the sensor and the retaining plate 3 is deflected by a large amount, the intermediate portion 3b or the mounting portion 3d knocks against the bottom surface of the stopper 8 so that the excessive rotation is restricted.

The stopper 8 has a through hole 8a through which the weight 4 extends at the central region thereof. The hole 8a is positioned inside the slits 32 formed in the retaining plate 3 (in other words, the outer periphery of the mounting portion 3d is positioned outside the hole 8a) in a plan view. Thus, even when an undesirable external force is applied and the mounting portion 3d is rotated by a large amount, the peripheral portion of the mounting portion 3d can be prevented from being caught by the hole 8a and the retaining plate 3 can be prevented from being damaged.

The board 1, which faces the retaining plate 3 with a small gap therebetween, also helps to restrict the deflection of the retaining plate 3. In order to avoid the situation that the mounting portion 3d comes into contact with the electrodes 1a and an abnormal signal is generated, the electrodes 1a are arranged such that the peripheral edges thereof are positioned inside the positions where the peripheral portion of the mounting portion 3d comes into contact with the board 1 when it rotates.

A metal (conductive) cover 6 is disposed on the stopper 8 with an insulating spacer 9 therebetween. The cover 6 protects the sensor from dust, moisture, external charged objects which may cause capacitance drift, noise, careless handling, etc.

The cover 6 includes a cylindrical head portion 6b, a flange portion 6a which extends outward from the head portion 6b, and tongue-shaped tabs 6c formed at the periphery. The cover 6 is fixed to the board 1 by bending the end portions of the tabs 6c formed at the periphery toward the bottom surface of the board 1 while the fixing plate 5 is uniformly pushed by the flange portion 6a. Since the spacer 2, the retaining plate 3, the fixing plate 5, the stopper 8, and the spacer 9 are fixed by being pushed toward the board 1 by the flange portion 6a of the cover 6, it is not necessary to apply an adhesive between these components and the assembly accuracy can be improved.

In addition, a packing 7 is fitted between the flange portion 6a and the peripheral portion of the board 1 so as to prevent foreign matter, flux, moisture, etc., from flowing to the inner region of the cover 6.

As shown in FIG. 1, a plurality of projections 9a are provided on the bottom surface of the spacer 9. The projections 9a extend through positioning holes formed in each of the stopper 8, the fixing plate 5, retaining plate 3, and the spacer 2 at positions corresponding to the projections 9a, and are fitted in recesses (holes) 1h formed in the board 1. Thus, the above-described components are accurately positioned with respect to each other.

A ground pattern (metal surface) 13f is formed on the bottom surface of the board 1 with which the tabs 6c comes into contact (see FIG. 7), and the cover 6 is grounded via the ground pattern 13f. Accordingly, the influence of external noise, etc., is eliminated. In addition, since the shape of the cover 6 is symmetric about an axial line which passes through the center of the mounting portion 3d and extends perpendicularly to the mounting portion 3d, initial offset capacitances are not generated. Although the cover 6 of the present embodiment has a shape such that a part of the cover 6 projects in a direction away from the electrodes 1a, the shape of the cover 6 is of course not limited to this.

The board 1 is a multilayer wiring board formed by laminating insulating plates 11 to 14 composed of ceramic material, epoxy resin, or the like. Top surfaces 11S to 13S of the plates 11 to 13 and bottom surfaces 13R and 14R of the plates 13 and 14 serve as a detection electrode layer, a ground layer, a power supply layer, a chip mounting surface, and a connection electrode surface, respectively.

Figure 4:
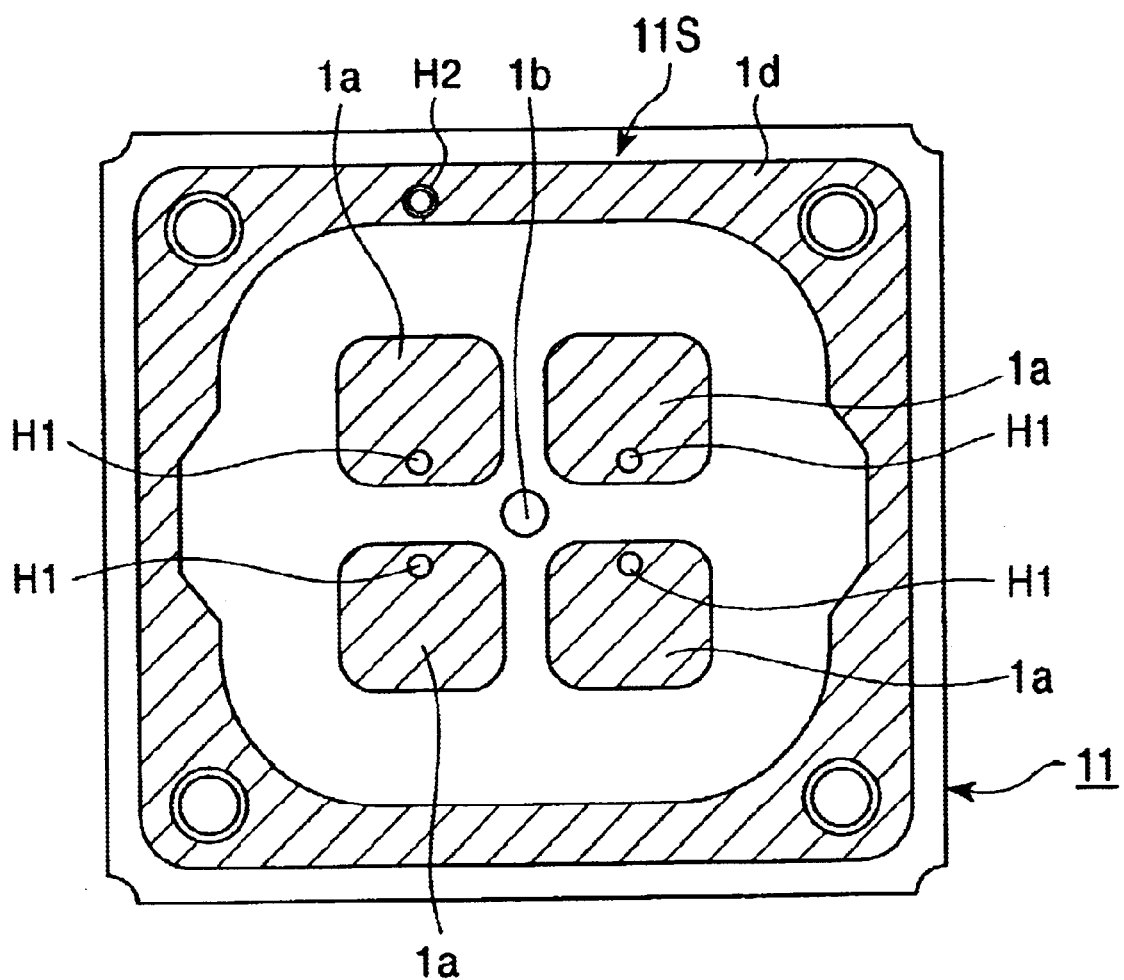
FIG. 4 is a sectional plan view showing the construction of a board included in the capacitive sensor according to the first embodiment of the present invention (a plan view of a plate)

As shown in FIG. 4, the four electrodes 1a are formed in a matrix pattern at the central region of the detection electrode layer 11S, that is, the top surface of the board 1 (or the top surface of the plate 11) by, for example, printing a silver (Ag) pattern. In addition, the electrode 1d having a rectangular frame shape is formed at the peripheral region of the detection electrode layer 11S, and is electrically connected to the spacer 2.

The electrodes 1a and the electrode 1d are respectively connected to terminals 13a and 13b on the chip mounting surface 13R with through-hole electrodes H1 and H2 which extend from the detection electrode layer 11S to the chip mounting surface 13R (see FIGS. 4 to 7). The through-hole electrodes H1 and H2 are constructed by forming thin holes by laser processing or press working, filling the holes with silver paste by screen printing, and baking the silver paste. Thus, the electrodes 1a and 1d are respectively connected to the terminals 13a and 13b via the through-hole electrodes H1 and H2 over approximately the shortest distance. Accordingly, electrical signals including detection signals and a drive signal can be transmitted to/from the processing circuit 1c without being substantially affected by electrical disturbances.

Figure 5:
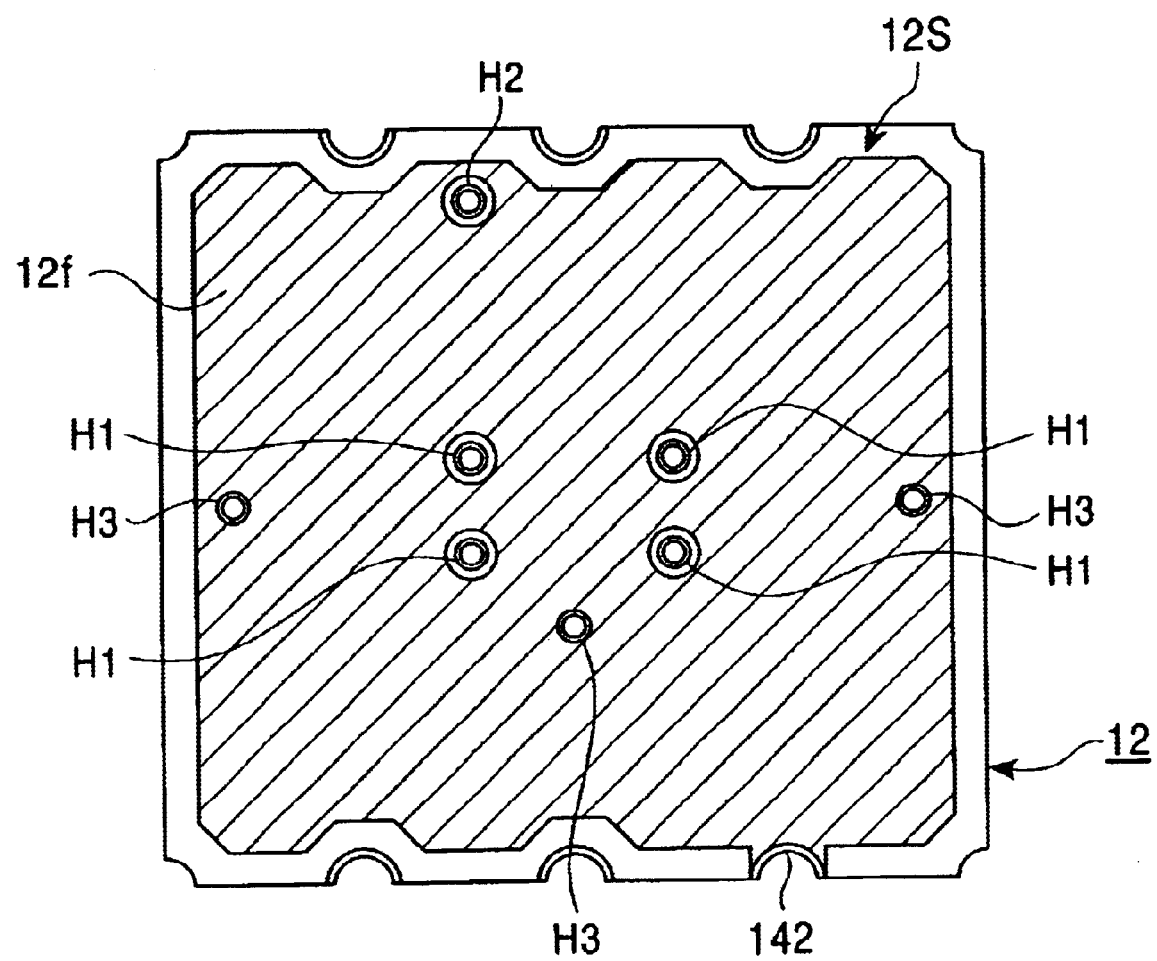
FIG. 5 is a sectional plan view showing the construction of the board included in the capacitive sensor according to the first embodiment of the present invention (a plan view of another plate)

The ground layer 12S prevents the drive signal from the retaining plate 3 from being input to the processing circuit 1c without passing through the electrodes 1a. In addition, the ground layer 12S serves as a noise shield which prevents noise from entering through the board 1. More specifically, the ground layer 12S prevents noise from reaching the detector unit K from the bottom side of the board 1, and from reaching the processing circuit 1c from the top side of the board 1. As shown in FIG. 5, approximately the entire region of the ground layer 12S excluding the through-hole electrodes H1 and H2 and the peripheral region of the plate 12 is constructed as a metal surface (conductive surface) 12f composed of, for example, silver (Ag). The metal surface 12f is electrically connected to the ground pattern 13f on the chip mounting surface 13R with a plurality of through-hole electrodes H3 which extend from the ground layer 12S shown in FIG. 5 to the chip mounting surface 13R shown in FIG. 7, and is connected to a terminal 13d. In addition, the metal surface 12f is grounded via a lead electrode 142 formed on a side surface of the board 1 (see FIG. 7). A plurality of through-hole electrodes H3 are provided in order to make the ground potential of the metal surface 12f, which serves as a ground pattern, uniform.

In order to prevent capacitive coupling with signal-detection capacitors constructed of the retaining plate 3 and the electrodes 1a, the ground layer 12S and the detection electrode layer 11S are sufficiently separated from each other. For example, the plate 11 has the thickness of, for example, about 0.4 mm. The thickness of the plate 11 is preferably 0.3 mm or more, and capacitive coupling with the detector unit K can be effectively prevented in such a case.

Figure 6:
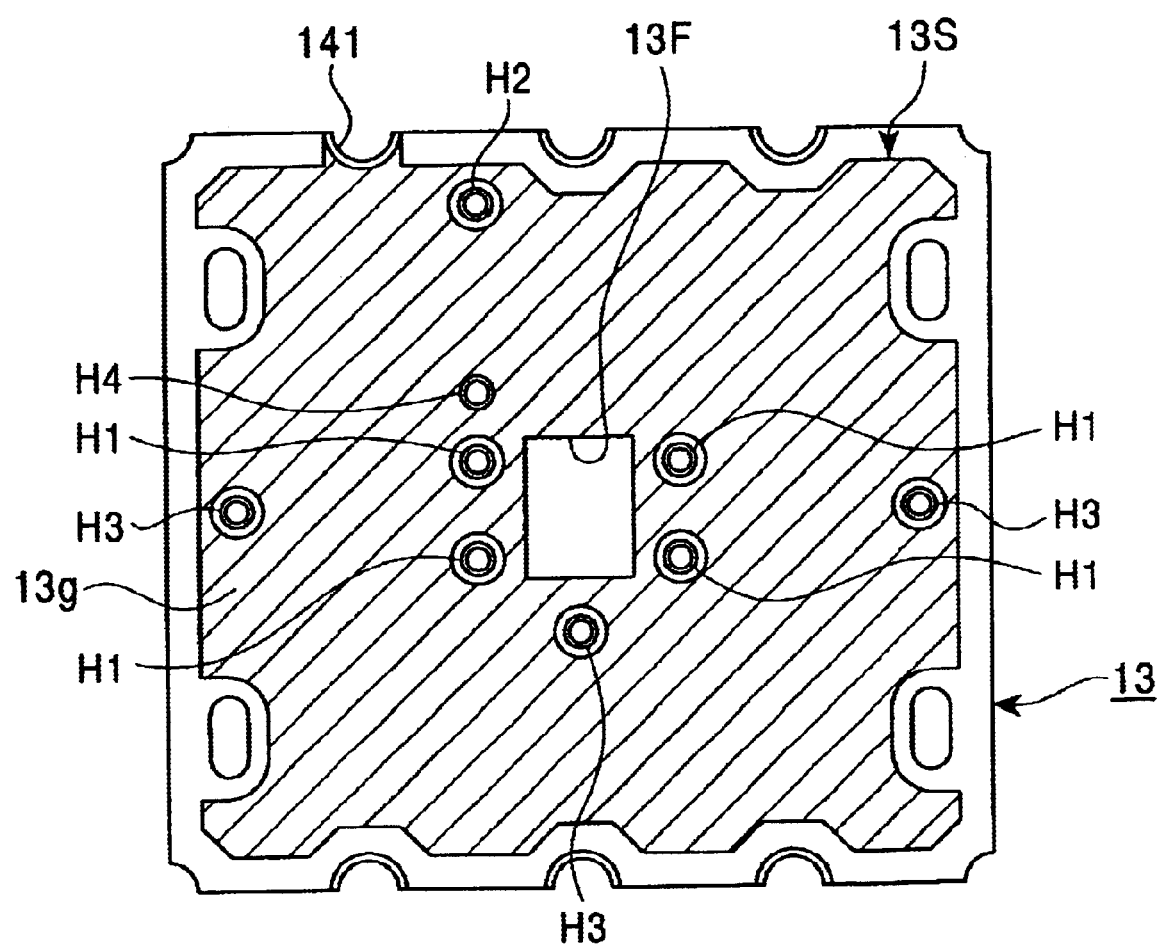
FIG. 6 is a sectional plan view showing the construction of the board included in the capacitive sensor according to the first embodiment of the present invention (a plan view of another plate)

The power supply layer 13S and the ground layer 12S serve as a bypass capacitor. As shown in FIG. 6, approximately the entire region of the power supply layer 13S excluding the through-hole electrodes H1 to H3 and the peripheral region of the plate 13 is constructed as a metal surface (conductive surface) 13g composed of, for example, silver (Ag). The metal surface 13g is connected to a terminal 13c on the chip mounting surface 13R with a through-hole electrode H4 which extends from the power supply layer 13S to the chip mounting surface 13R (see FIG. 7). In addition, the potential of the metal surface 13g is set to a power supply potential by being connected to a lead electrode 141 formed on a side surface of the board 1.

The ground layer 12S is closer to the power supply layer 13S than to the top surface (detection electrode layer) 11S of the board 1, and the power supply layer 13S and the ground layer 12S are disposed in proximity of each other. For example, a thin plate having the thickness of about 0.1 mm is used as the plate 12. Accordingly, a bypass capacitor is constructed of the ground layer 12S and the power supply layer 13S, so that it is not necessary to use an additional capacitor. Thus, the structure of the sensor can be made simpler. The thickness of the plate 12 is preferably 0.2 mm or less, and functions of a bypass capacitor can be reliably obtained in such a case.

In addition, in order to prevent capacitive coupling between the power supply layer 13S, which is more easily affected by noise compared to the ground layer 12S, and the processing circuit 1c, the metal surface 13g includes an open area 13F in which the metal pattern is not formed at the central region corresponding to the position where the processing circuit 1c is disposed.

Figure 7:
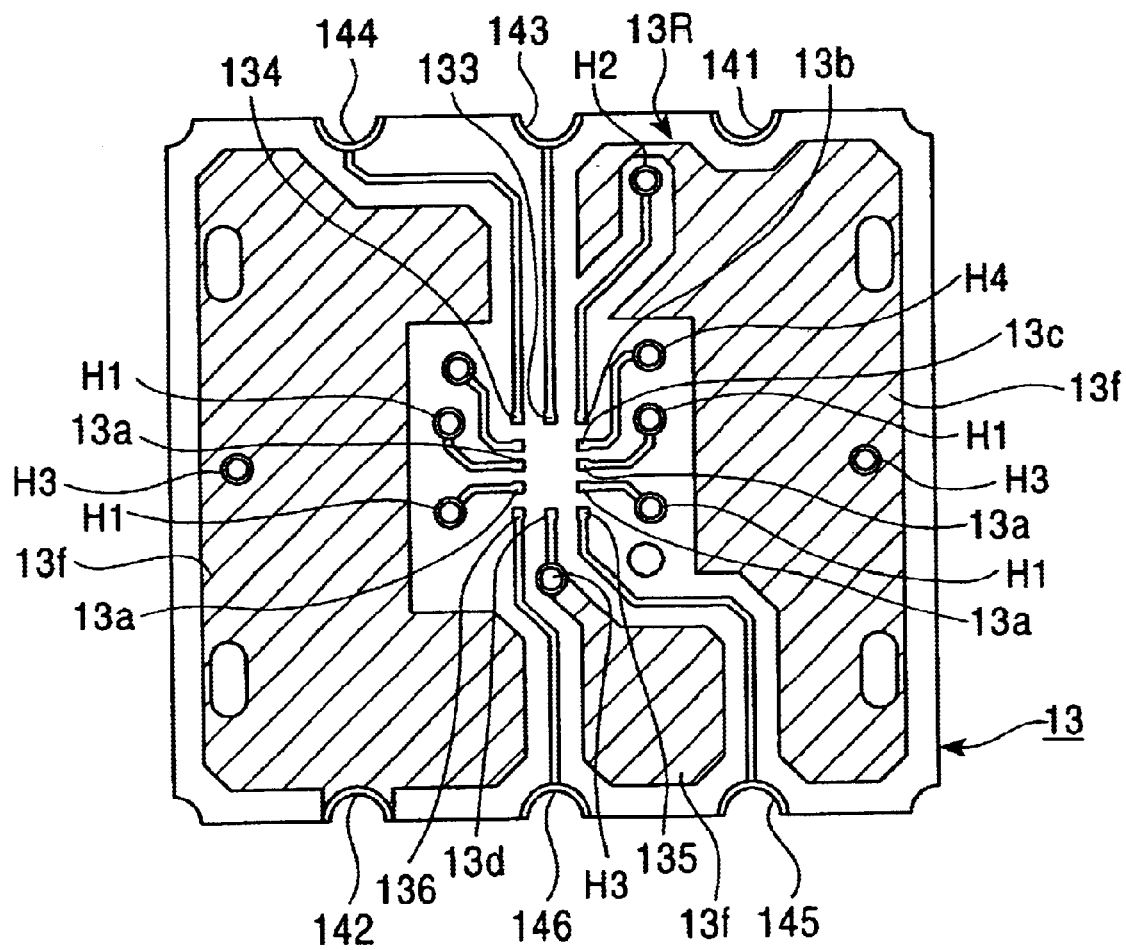
FIG. 7 is a sectional plan view showing the construction of the board included in the capacitive sensor according to the first embodiment of the present invention (a rear view of the plate shown in FIG. 6)

As shown in FIG. 7, short electric lines which serve as signal lines between the detector unit K and the processing circuit 1c and connect the through-hole electrodes H1 and H2 to the terminals (pads) 13a and 13b, respectively, are formed on the chip mounting surface 13R. In addition, electric lines which serve as output lines from the processing circuit 1c to an external device (not shown) and connect terminals (pads) 133 to 136 to lead electrodes 143 to 146, respectively, are also formed on the chip mounting surface 13R. In addition, in order to block external noise, the metal surface 13f which is composed of, for example, silver (Ag), and which serves as the ground pattern is formed at regions excluding the through-hole electrodes H1 to H4 and the electric lines connected thereto.

In order to prevent capacitive coupling with the bypass capacitor constructed of the power supply layer 13S and the ground layer 12S, the power supply layer 13S and the chip mounting surface 13R are sufficiently separated from each other. For example, the plate 13 has the thickness of, for example, about 0.2 mm, and is thicker than the plate 12. The thickness of the plate 13 is preferably 0.15 mm or more, and capacitive coupling between the processing circuit 1c and the detector unit K or between the processing circuit 1c and the above-described bypass capacitor can be effectively prevented in such a case.

Figure 8:
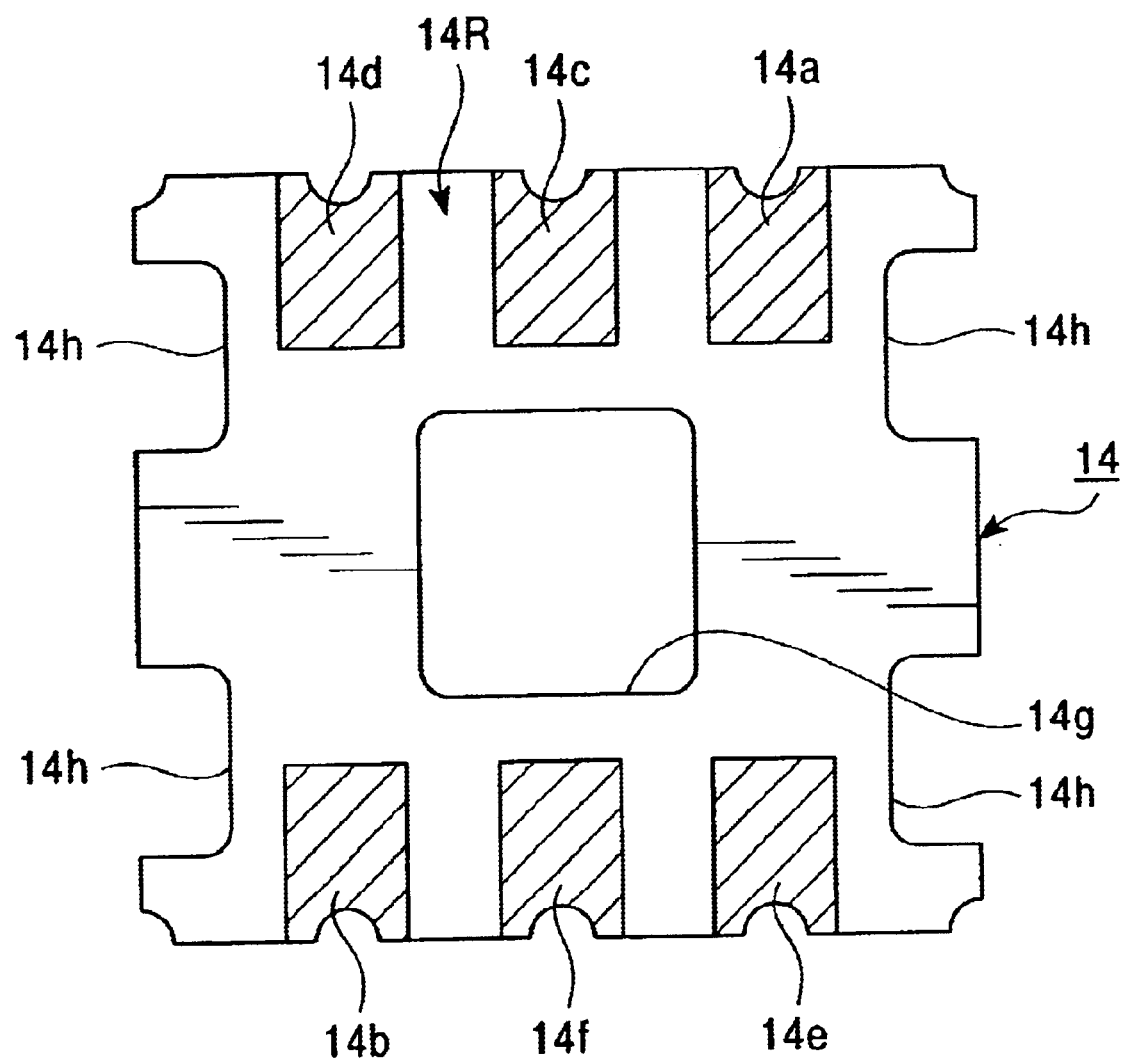
FIG. 8 is a sectional plan view showing the construction of the board included in the capacitive sensor according to the first embodiment of the present invention (a rear view of another plate)

As shown in FIG. 8, six external connection electrodes 14a to 14f are formed on the connection electrode surface 14R and are respectively connected to lead electrodes 141 to 146 formed on the side surfaces of the board 1. By soldering the connection electrode surface 14R on an external printed circuit board (PCB), the capacitive sensor can be connected to an external device (not shown) via the external connection electrodes 14a to 14f. The cover 6 and the ground layer 12S (the metal surface 12f which serves as the ground pattern) are grounded via the external connection electrode 14b, and electrical power is supplied to the power supply layer 13S (metal surface 13g) from the external device via the external connection electrode 14a. In addition, a processing result obtained by the processing circuit 1c is output to the external device via the external connection electrodes 14c to 14f.

The plate 14 has an opening 14g for receiving the processing circuit 1c at the central region thereof, and the thickness of the plate 14 is set such that the connection electrode surface 14R can be surface-mounted on the printed circuit board (PCB), that is, such that the processing circuit 1c does not protrude from the connection electrode surface 14R.

In addition, cut portions 14h for receiving the tabs 6c of the cover 6 are formed in two opposing sides of the plate 14, and parts of the ground pattern 13f on the chip mounting surface 13R face outward through the cut portions 14h. Accordingly, by crimping the end portions of the tabs 6c and bringing them into contact with the ground pattern 13f which face outward through the cut portions 14h, the cover 6 can be electrically connected to the ground pattern 13f.

The processing circuit 1c is mounted on the chip mounting surface 13R at the bottom of the board 1, and the terminals 13a and 13b for signal detection, the terminal 13c for power supply, the terminal 13d for grounding, and the terminals 133 to 136 for signal output, all of which are formed on the chip mounting surface 13R, are connected to their respective aluminum terminals 300a of the processing circuit 1c with gold bumps 310. The drive signal is applied to the retaining plate 3 via the terminal 13b for driving, and electrical signals such as voltages detected by the electrodes 1a, which are arranged so as to face the retaining plate 3, are input to the processing circuit 1c via the terminals 13a for detection. The capacitance changes in the signal-detection capacitors are determined on the basis of the thus obtained electrical signals.

Four signal-detection capacitors are constructed of the retaining plate 3 and the electrodes 1a, and the direction and amount of tilt of the capacitive sensor are calculated on the basis of the capacitance changes in these four capacitors. The calculation results are output to the external device via the terminals 133 to 136 for signal output and the external connection electrodes 14c to 14f.

The terminals (pads) 13a to 13d and 133 to 136 and the terminals 300a are preferably coated with gold in order to improve their bondability.

In the present embodiment, the processing circuit 1c is a bare integrated circuit chip. This bare chip is constructed by forming a circuit element 300c called a diffusion layer on a substrate 300b composed of a semiconductor material such as silicon (semiconductor substrate) at the central region thereof by thermal diffusion method, ion implantation method, etc. Approximately the entire region of a surface of the bare chip (processing circuit) 1c including the circuit element (diffusion layer) 300c (that is, the top surface in FIG. 1) is covered with an insulating film (not shown) composed of silicon dioxide ($SiO_2$). A plurality of aluminum (Al) patterns (not shown) are formed on the insulating film, and are electrically connected to their respective terminals 300a at one end thereof. In addition, a plurality of small through holes are formed in the insulating film at predetermined positions above the circuit element 300c, and the above-described Al patterns are connected to predetermined portions of the circuit element 300c via these through holes.

One of the Al patterns which is electrically connected to the terminal 300a which is connected to the terminal (pad) 13d for grounding by bump bonding is connected to the substrate 300b via a small hole (not shown) formed in the insulating film on the substrate 300b. Accordingly, the substrate 300b is electrically connected to the metal surface 12f (ground layer), which serves as the ground pattern of the board 1, via the Al pattern, the terminal 300a for grounding, the gold bump 310, the pad 13d, the through-hole electrode H3, etc. Since the circuit element 300c is surrounded by the grounded substrate 300b at the bottom and sides thereof and the ground layer 12S is disposed above the circuit element 300c, the circuit element 300c is almost completely shielded and is hardly affected by external noise.

In addition, for the purpose of reinforcing, the processing circuit (bare chip) 1c is bonded to the chip mounting surface 13R with an insulating resin 320 such as epoxy resin. More specifically, the chip mounting surface 13R on which the processing circuit 1c is not yet mounted is made to face upward, and the liquid epoxy resin 320 is poured on the chip mounting surface 13R at a region surrounded by the pads with a dispenser or the like. Then, the processing circuit 1c is placed on the chip mounting surface 13R at a predetermined position such that the circuit element 300c of the processing circuit 1c faces the board 1. At this time, the epoxy resin 320 spreads beyond the region surrounded by the gold bumps 310 due to its fluidity. Then, an ultrasonic wave is applied from the back of the processing circuit 1c, so that the pads 13a to 13d and 133 to 136 are bonded to their respective terminals 300a of the processing circuit 1c with the gold bumps 310 by ultrasonic bonding. Then, the epoxy resin 320 is thermally cured so that the processing circuit 1c is bonded on the chip mounting surface 13R.

The resin 320 spreads beyond the terminals 300a and serves to protect the bonding surfaces and the terminals 300a from corrosion and the like. Although the entire region of the processing circuit 1c may be covered with the resin 320, this is not necessary since the substrate 300b is grounded. The processing circuit 1c may of course be disposed outside the sensor as in common sensors. However, since the capacitances between the mounting portion 3d and the electrodes 1a are small, such as less than 1 pF (although this varies with size), it is not practicable to extend standard lead wires to the input terminals of the processing circuit 1c in view of assembly errors, movements of wires due to the tilt and capacitance variations caused by such movements, noise, aging, etc. Accordingly, when a high detection accuracy is required, the processing circuit 1c is preferably provided on the bottom surface of the board 1, so that the detection signals can be input to the processing circuit 1c over approximately the shortest distance and the influence of external noise, etc., can be minimized.

Next, the operation of the sensor will be described below. As described above, when the overall body of the sensor is tilted, the distances between the mounting portion 3d and the electrodes 1a change so that the capacitances therebetween also change. Thus, the tilt of the sensor can be determined by electrically detecting the capacitance changes.

More specifically, when the sensor is tilted, the weight 4 rotates around the contact point between the convex portion 1b and the mounting portion 3d and applies a moment around one or both of the axial line of the axial portions 3c and the axial line of the axial portions 3e to the mounting portion 3d.

The torsional moment applied when the weight 4 tilts is separated into a torsional force around the axial portions 3c and a torsional force around the axial portions 3e, and the mounting portion 3d rotates around the axial portions 3c and around the axial portions 3e independently by the amounts corresponding to the direction and angle of tilt of the sensor. The rotational center of the mounting portion 3d is always separated from the board 1 by a constant distance due to the convex portion 1b, and the capacitances of the detection capacitors increase or decrease linearly with respect to the torsional forces applied when the sensor tilts. Since the weight 4 has a 'T' shape in cross section and the gravity center of the weight 4 is at a relatively high position, large torsional forces are applied. In addition, since the lengths of the axial portions 3c and 3e of the retaining plate 3 are increased due to the notch portions 31a and 32a, the rigidities of the axial portions 3c and 3e are reduced. Accordingly, even a slight tilt of the sensor causes a large rotation of the mounting portion 3d with respect to the board 1.

Then, the mounting portion 3d stops at an angle such that the torsional restoring forces of the axial portions 3c and 3e are balanced with the torsional forces applied to the axial portions 3c and 3e.

Due to the above-described rotation of the mounting portion 3d, the capacitances of the signal-detection capacitors constructed of the mounting portion 3d and the electrodes 1a change, and the capacitance changes are input to the processing circuit 1c, which is mounted at a position approximately directly below the electrodes 1a, via the through-hole electrode H1, the terminals 13a, etc. The processing result obtained by the processing circuit 1c is output to the external device via the external connection electrode 14c to 14f on the connection electrode surface 14R.

Since the retaining plate 3 is used as a common electrode, a high shielding effect can be obtained by electrically grounding the retaining plate 3.

Thus, according to the capacitive sensor of the present embodiment, the mounting portion 3d is retained by the intermediate portion 3b in such a manner that the mounting portion 3d can rotate around the second axial portions 3e, and the intermediate portion 3b is retained by the retaining portion 3a in such a manner that the intermediate portion 3b can rotate around the first axial portions 3c which extend perpendicularly to the second axial portions 3e, so that the mounting portion 3d can rotate around two axes independently. Accordingly, the mounting portion 3d can easily rotate and the displacement of the mounting portion 3d with respect to the electrodes 1a during the rotation can be increased compared to a known capacitive sensor in which capacitances are changed simply by using the elastic distortion of a flexible plate. Therefore, the displacement of the mounting portion 3d around two axes due to tilt, etc., can be detected by a single sensor with high sensitivity.

In addition, since the bottom portion 4a of the weight 4 is thinner than the head portion 4A, which is the main body of the weight 4, the gravity center of the weight 4 is at a higher position compared to the case in which the bottom portion 4a and the head portion 4A has the same thickness. Accordingly, a large moment can be applied to the retaining plate 3 and the sensitivity can be increased. In addition, in this case, the position of the gravity center of the weight 4 changes along with the weight ratio between the head portion 4A and the bottom portion 4a. Therefore, when the weight of the weight 4 is constant, the moment applied to the retaining plate 3 can be increased by increasing the weigh ratio of the head portion 4A to the bottom portion 4a. Accordingly, the sensitivity can also be increased. In addition, when the moment is constant, the weight of the weight 4 can be reduced, so that the impact resistance of the sensor can be increased. Furthermore, when the thickness of the bottom portion 4a is reduced, the bonding area between the bottom portion 4a and the mounting portion 3d can also be reduced, and there is more freedom in the design of the retaining plate 3.

As described above, the lengths of the axial portions 3c and 3e are increased by forming the notch portions 31a and 32a in the retaining portion 3a and the mounting portion 3d, respectively, at both ends of the first slits 31 and the second slits 32, respectively. Accordingly, plastic deformation of the axial portions 3c and 3e does not easily occur when they are twisted, and the amount of rotation can be increased. The notch portions 31a and 32a are formed only in the retaining portion 3a and the mounting portion 3d, respectively, so that the intermediate portion 3b has a constant width. Accordingly, the torsional force can be uniformly distributed over the entire area of the intermediate portion 3b, and plastic deformation of the intermediate portion 3b due to stress concentration can be prevented. Therefore, even when the width of the intermediate portion 3b is reduced to increase the amount of deflection of the retaining plate 3, plastic deformation of the intermediate portion 3b does not easily occur, so that the sensitivity can be increased without reducing the impact resistance.

In addition, since the peripheral portion and the central portion of the retaining plate 3 are retained by the spacer 2 and the convex portion 1b, respectively, a constant gap can be maintained between the retaining plate 3 and the electrodes 1a. In particular, since the mounting portion 3d is supported by the convex portion 1b at the bottom side thereof, it can be prevented from being deflected toward the board 1 due to the weight of the weight 4. Accordingly, the tilt of the sensor, etc., can be calculated without taking the vertical displacement of the mounting portion 3d due to the weight of the weight 4 into account, so that the calculation can be simplified and the detection accuracy can be improved.

In addition, since the height of the convex portion 1b is larger than the total thickness of the spacer 2 and the electrode 1d, the intermediate portion 3b is deformed such that it is displaced upward from the first axial portions 3c toward the second axial portions 3e. The intermediate portion 3b constantly pushes the mounting portion 3d against the convex portion 1b, so that a preload is applied to the mounting portion 3d. Therefore, even when the sensor is turned over and the weight of the weight 4 is applied, the intermediate portion 3b is continuously pushed against the convex portion 1b. Accordingly, the gap between the mounting portion 3d and the board 1 is reliably maintained constant, and a constant detection accuracy can be obtained irrespective of the state in which the sensor is attached. Furthermore, even when the sensor is rotated while it is being used, the mounting portion 3d and the convex portion 1b can be prevented from being deformed or damaged by repeatedly knocking against each other.

The above-described biasing force is determined on the basis of the difference between the thickness of the spacer 2 and the height of the convex portion 1b. Therefore, when, for example, the gap size is set by adjusting the height of the convex portion 1b, the biasing force can be adjusted independently of the gap size by changing the thickness of the spacer 2. By adjusting the height of the convex portion 1b and the thickness of the spacer 2 independently, the sensitivity of the sensor which is determined by the gap size can be increased and the stability of the state in which the mounting portion 3d is retained can be improved at the same time.

In addition, since predetermined electric signals are supplied to the mounting portion 3d via the spacer 2, it is not necessary to provide an additional electric line for signal supply, so that the parasitic capacitance of such an electric line is not generated.

Figure 9:
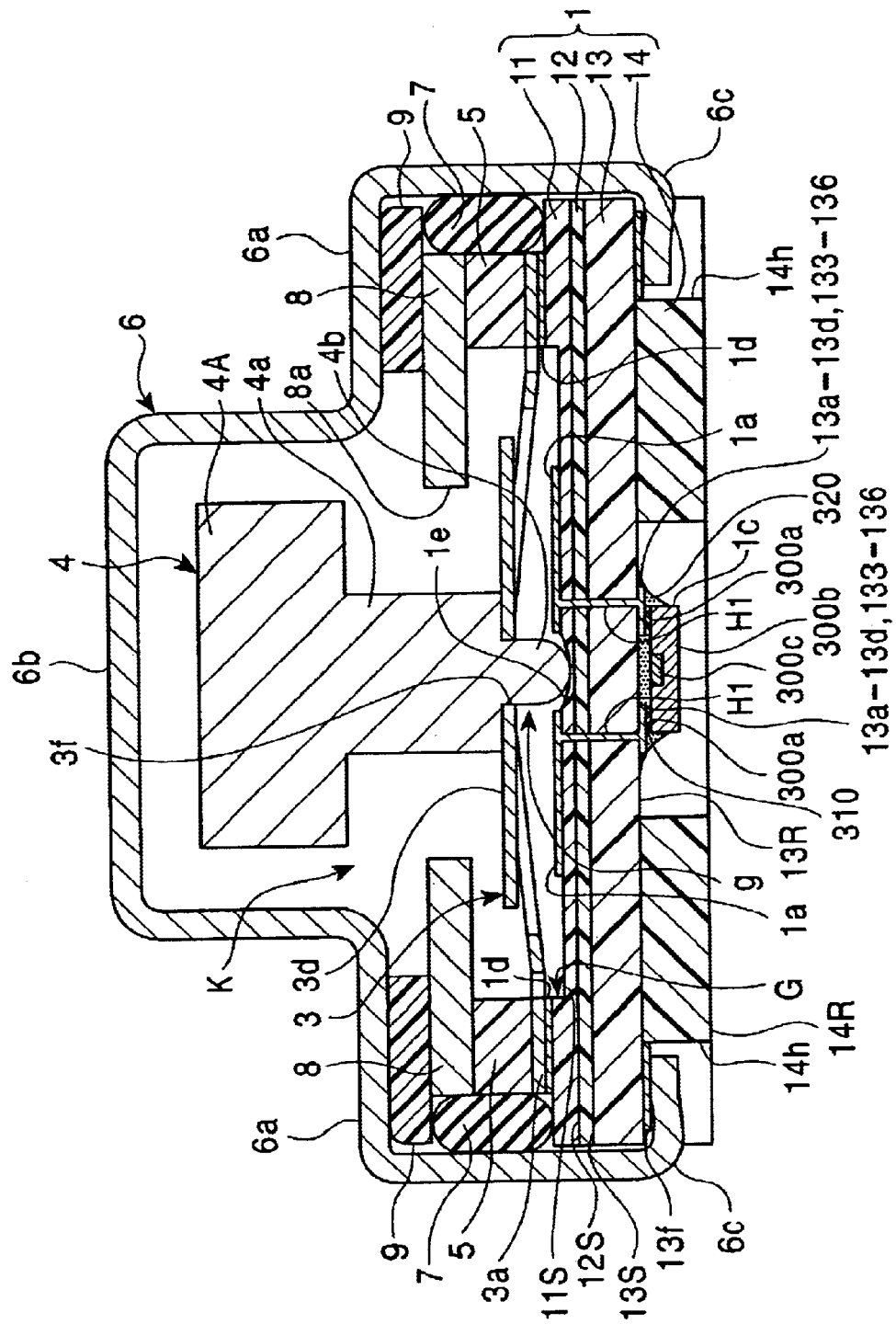
FIG. 9 is a schematic sectional view corresponding to FIG. 2, showing the overall construction of a capacitive sensor according to a second embodiment of the present invention.

Next, a capacitive sensor according to a second embodiment of the present invention will be described below with reference to FIG. 9. The capacitive sensor of the present embodiment is different from that of the first embodiment in that the convex portion 1b is omitted, and a projection (retaining projection) 4b is provided on the bottom portion 4a of the weight 4 in place of the convex portion 1b. The projection 4b extends through a hole 3f formed in the mounting portion 3d at the central region thereof and is in contact with the board 1 at the central position of the four electrodes 1a. The projection 4b serves to maintain a constant gap between the mounting portion 3d and the board 1, and the mounting portion 3d rotates around the contact point (retaining point) between the projection 4b and the board 1.

In addition, a concave portion 1e for receiving the end portion of the projection 4b is formed in the board 1 at the central position of the four electrodes 1a, so that the retaining point at the end of the projection 4b is fixed such that it does not move in the planar direction. The concave portion 1e is centered on the gravity center of the weight 4 in a plan view, so that the weight 4 is supported by the projection 4b in such a manner that the gravity center thereof is directly above the projection 4b.

In addition, the retaining portion 3a of the retaining plate 3 is directly laminated on the electrode 1d, and the central portion of the mounting portion 3d is retained by the projection 4b in such a manner that the mounting portion 3d is biased in a direction away from the board 1. Accordingly, the weight 4 attached to the mounting portion 3d is constantly pushed against the board 1, and even when the sensor is turned over and the weight of the weight 4 is applied, the end portion of the projection 4b is continuously pushed against the board 1.

The board 1 is formed by resin molding and also serves the function of the spacer 2. More specifically, the retaining portion 3a of the retaining plate 3 is disposed on the board 1, and the electrodes 1a are formed on the surface of a step portion (recessed portion) G.

Accordingly, functions similar to those of the convex portion 1b of the first embodiment can also be obtained by the construction of the present embodiment. In addition, since the weight 4 is supported on the board 1 by the projection 4b which is formed integrally with the weight 4 and serves as the retaining projection, the positional relationship between the retaining point of the projection 4b (that is, the contact point between the projection 4b and the board 1) and the gravity center of the weight 4 can be set more accurately. In addition, since the retaining point, which serve as the rotational center of the weight 4, is fixed such that it does not move in the planar direction from the position which coincides with the gravity center of the weight 4 in a plan view, the mounting portion (movable portion) 3d and the board 1 are parallel to each other when the sensor is in a horizontal position, that is, in a neutral state. Accordingly, offset signals are not generated and the mounting portion 3d can rotate with respect to the fixed electrodes 1a in a balanced manner. Therefore, the amount of rotation of the mounting portion 3d due to an external force is constant irrespective of the direction from which the external force is applied, and a constant sensitivity can be obtained irrespective of the direction of tilt (that is, the direction of stress).

In addition, according to the present embodiment, the spacer 2, which is disposed between the electrode 1d and the retaining portion 3a in the construction of the first embodiment, is omitted, so that the number of components and assembly processes are reduced. Thus, the manufacturing costs can be reduced. In addition, since the end portion of the projection 4b is retained by the concave portion 1e formed in the board 1 such that it does not move in the planar direction, the mounting portion 3d can always be rotated around the same point and stable detection accuracy can be obtained.

Figure 10:
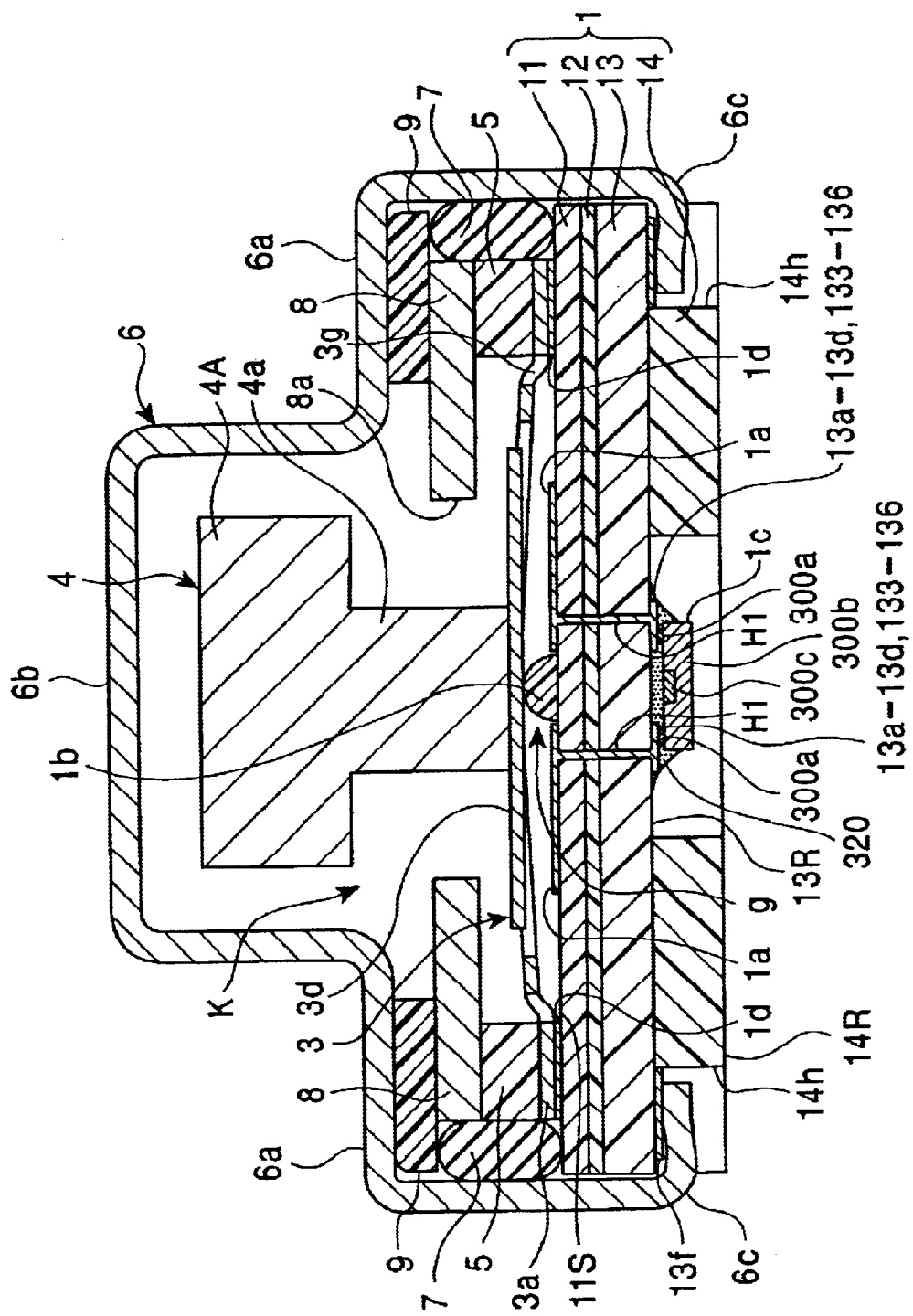
FIG. 10 is a schematic sectional view corresponding to FIG. 2, showing the overall construction of a capacitive sensor according to a third embodiment of the present invention.

Next, a capacitive sensor according to a third embodiment of the present invention will be described below with reference to FIG. 10. In the sensor of the present embodiment, a peripheral portion 3g of the retaining plate 3 is bent toward the board 1, and the peripheral portion 3g retains the retaining plate 3 above the board 1 so that a gap is provided between the mounting portion 3d and the electrodes 1a. Thus, the spacer 2 used in the first embodiment is omitted. Other constructions are similar to those of the first embodiment.

Also in the present embodiment, it is not necessary to provide a spacer or the like between the retaining portion 3a and the board 1, so that the accuracy of the gap size between the mounting portion 3d and the electrodes 1a can be improved. In addition, the number of components and assembly processes can be reduced, so that the manufacturing costs can be reduced. In addition, according to the present embodiment, the biasing force applied to the mounting portion 3d can be adjusted by changing the amount of bending of the peripheral portion 3g of the retaining portion 3a.

Figure 11:
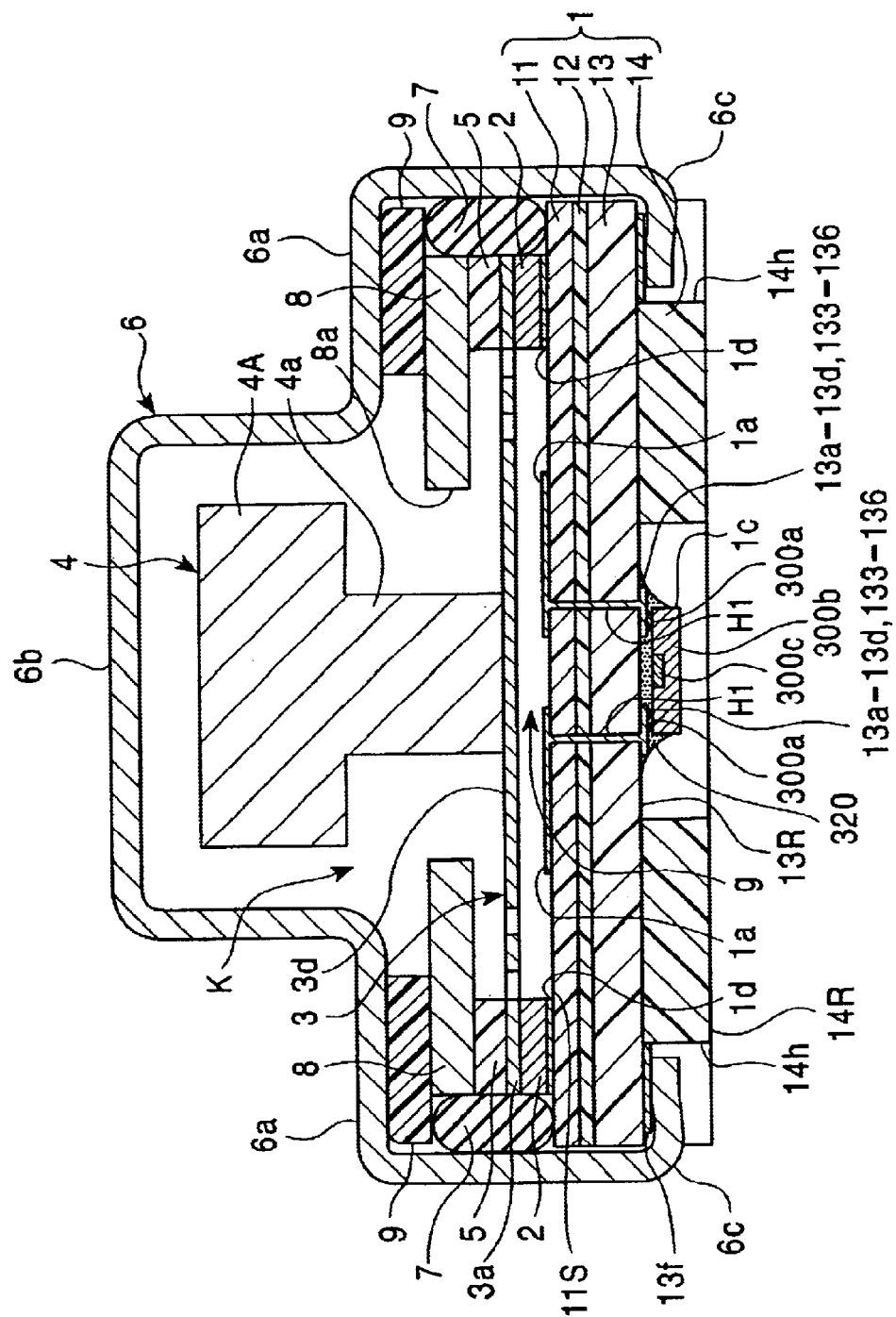
FIG. 11 is a schematic sectional view corresponding to FIG. 2, showing the overall construction of a capacitive sensor according to a fourth embodiment of the present invention.

Next, a capacitive sensor according to a fourth embodiment of the present invention will be described below with reference to FIG. 11. The sensor of the present embodiment is constructed similarly to that of the first embodiment, but the convex portion 1b is omitted and the gap g between the mounting portion 3d and the board 1 is provided only by the spacer 2. This construction is effective when the deflection of the retaining plate 3 due to the weight of the weight 4 is small enough to be ignored. Since the convex portion 1b is omitted, the structure of the sensor can be made simpler and the costs can be reduced.

Figure 12:
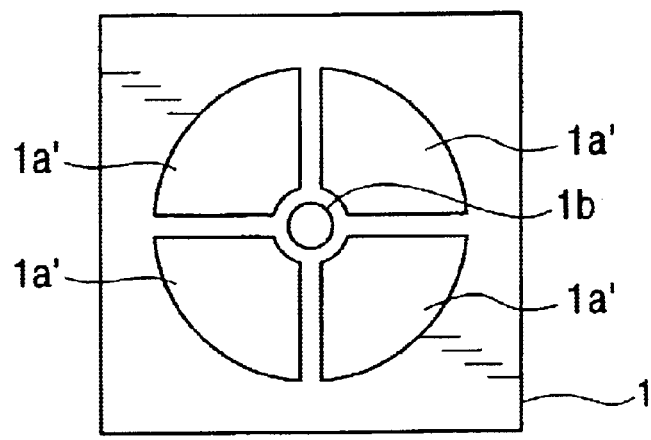
FIG. 12 is a plan view showing a modification of the shape of the electrodes included in the capacitive sensor according to the present invention.

Next, modifications of the electrodes (fixed electrodes) 1a according to the above-described embodiments of the present invention will be described below with reference to FIGS. 12 and 13. Electrodes 1a' shown in FIGS. 12 and 13 have different shapes and are arranged differently compared to the electrodes 1a shown in FIG. 4. With reference to FIG. 12, electrodes 1a' are arranged in a circular pattern. More specifically, each electrode 1a' is shaped like a sector obtained by dividing a circular electrode into four pieces. In this case, suppose an output obtained from the upper right electrode 1a' is 100 when the mounting portion 3d is tilted in the direction of 45° in the upper right region of the figure by a certain amount, outputs obtained from the upper right and the upper left electrodes 1a' would be 50 each if the mounting portion 3d is tilted in the upward direction by the same amount. Thus, since the electrodes 1a' are circularly symmetric about the center, constant sensitivity can be obtained irrespective of the direction.

Figure 13:
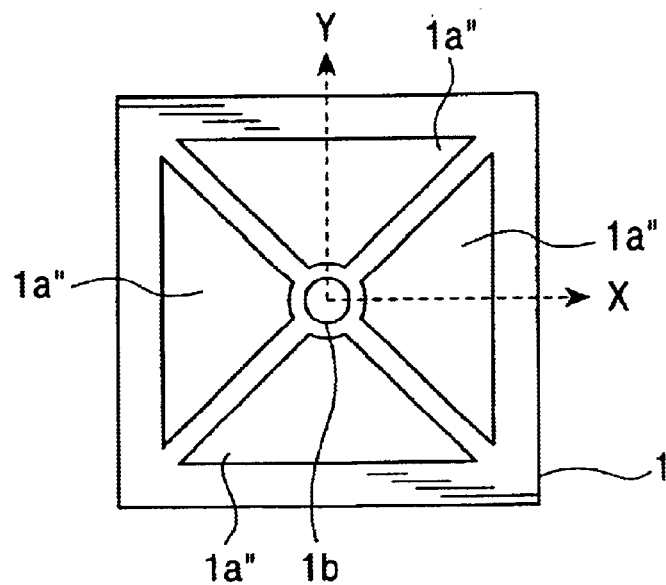
FIG. 13 is a plan view showing another modification of the shape of the electrodes included in the capacitive sensor according to the present invention.

In FIG. 13, electrodes 1a" have an approximately triangular shape. More specifically, each electrode 1a" has an approximately triangular shape obtained by dividing a rectangular electrode into four pieces by two diagonal lines. Compared to the electrodes 1a shown in FIG. 4, each electrodes 1a" shown in FIG. 13 broadens toward the periphery, so that the sensitivity can be easily increased.

The electrodes 1a" are separated in the vertical and horizontal directions (that is, the directions in which the axial portions 3c and 3e extend). Accordingly, even when the sensor is not attached to a substrate (not shown) in a manner inclined at 45° (although this varies with the orientation of the substrate), the calculation for the vertical and horizontal directions performed by the processing circuit 1c can be simplified. More specifically, in the coordinate system where the origin is at the intersecting point of the board 1 and a line which passes through the rotational center of the mounting portion 3d and extends perpendicularly to the board 1 and X and Y axes extend along the axial lines of the axial portions 3e and 3c, respectively, two electrodes 1a" are arranged along each of the X and Y axes at positions symmetrical about the origin. Accordingly, the rotation around the axial portions 3c and the rotation around the second axial portions 3e can be detected independently, and the signals representing the rotations around the axial portions 3c and 3e can be separated from each other.

Figure 14:
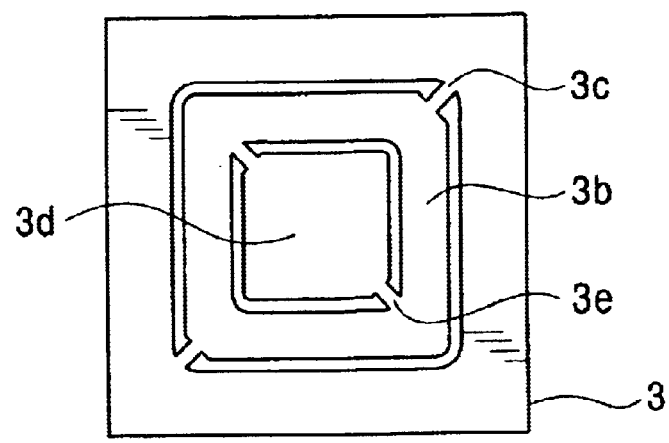
FIG. 14 is a plan view showing a modification of the shape of the retaining plate included in the capacitive sensor according to the present invention.

Next, modifications of the retaining plate 3 according to the above-described embodiments of the present invention will be described below with reference to FIGS. 14 and 15. In a retaining plate 3 shown in FIG. 14, first axial portions 3c and second axial portions 3e are formed at different positions compared to those of the retaining plate 3 shown in FIG. 3. In the case in which the retaining plate 3 has an approximately rectangular shape and the lengths of the first and the second axial portions 3c and 3e are to be increased in order to reduce the rigidities thereof, the spaces of the intermediate portion 3b and the mounting portion 3d are less reduced and the lengths of the axial portions 3c and 3e can be more easily increased if the axial portions 3c and 3e are formed at the corners and not at the centers of each side. Thus, the axial portions 3c and 3e, the intermediate portion 3b, and the mounting portion 3d can be arranged in a small space while the lengths of the axial portions 3c and 3e are sufficiently increased to prevent permanent deformation of the axial portions 3c and 3e. Accordingly, the size of the sensor can be reduced.

Figure 15:
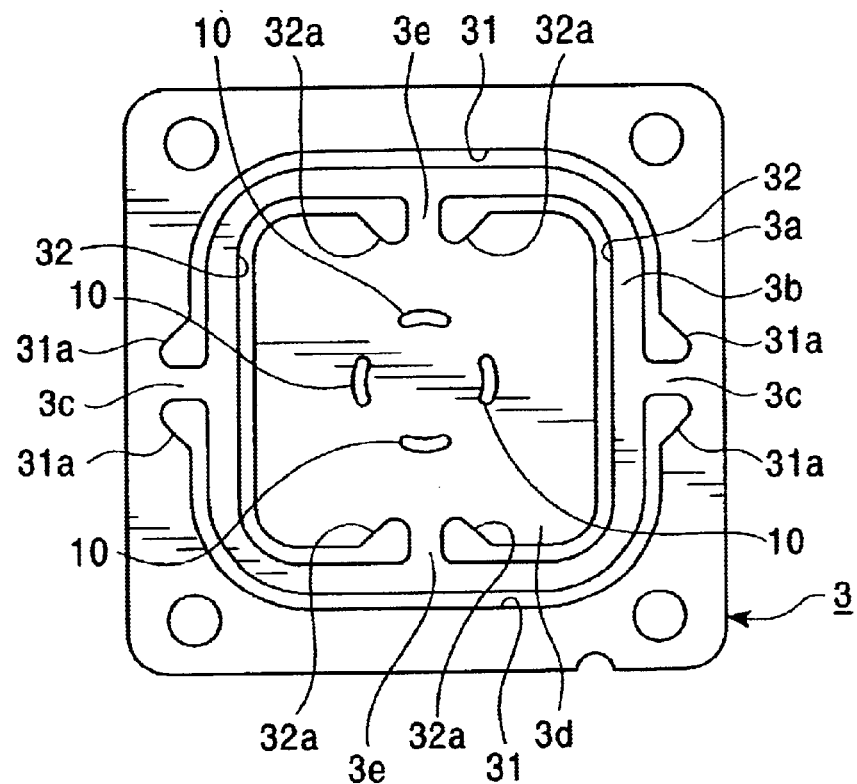
FIG. 15 is a plan view showing another modification of the shape of the retaining plate included in the capacitive sensor according to the present invention.

In addition, a retaining plate 3 shown in FIG. 15 has a construction similar to that of the retaining plate shown in FIG. 3, but has slit-shaped through holes (slit holes) 10 at positions around the bonding area between the weight 4 and the mounting portion 3d in the central region of the mounting portion 3d. A plurality of holes 10 (four in FIG. 15) are arranged along a circumference around the bonding area, and are positioned symmetrically about the axial portions 3c and 3e. In the case in which the weight 4 is bonded to the mounting portion 3d by welding, the slit holes 10 are formed at positions close to the welding area, which is the bonding area, in the peripheral region of thereof. In addition, in the case in which the weight 4 is bonded to the mounting portion 3d by crimping, a plurality of arc-shaped slit holes 10 are formed along the periphery of the crimping area, which is the bonding area. In order to minimize the capacitance loss at the slits holes 10, the slit holes 10 are preferably arranged at positions between the adjacent electrodes 1a in a plan view.

According to the present embodiment, the stress applied at the bonding area when the weight 4 is bonded to the mounting portion 3d can be reduced by the holes 10. Accordingly, warping and deformation of the retaining plate 3 can be prevented and the detection accuracy of the sensor can be improved. In addition, since the holes 10 are formed symmetrically about the axial portions 3c and 3e, the difference in detection accuracy between the axial directions 3c can be reduced.

The present invention is not limited to the above-described embodiments, and various modifications are possible within the scope of the present invention.

For example, a plurality of fixed electrodes 1a are arranged such that they face a single mounting portion 3d (that is, movable electrode) in the above-described embodiments. Alternatively, however, a single fixed electrode may be arranged such that it faces a plurality of movable electrodes. More specifically, a single electrode may be formed on the board 1, and a plurality of (for example, four) movable electrodes may be formed on the bottom surface of an insulating mounting portion. In addition, a plurality of fixed electrodes and a plurality of movable electrodes may also be arranged such that they face each other.

In addition, in the first embodiment, the electrical signals may also be supplied to the mounting portion 3d via the convex portion 1b instead of being supplied to the mounting portion 3d via the spacer 2. More specifically, the convex portion 1b may be composed of a conductive material, and be electrically connected to the processing circuit 1c with a through-hole electrode which penetrates through the board 1 in the thickness direction thereof. Also in this case, effects similar to those of the first embodiment can be obtained. In addition, in this case, the electrode 1d formed at the peripheral region of the board 1 can be omitted.

In addition, in the above-described embodiments, the retaining plate 3 is not limited to a metal plate, and any one of a metal plate, a semiconductor plate, and an insulating plate may be used as long as it is flexible and flat. The thickness of the retaining plate 3 is also not limited, and a polymeric film composed of polyimide or the like, a metal film, a thin silicon substrate whose thickness is reduced by etching, etc., may be suitably used. When the retaining plate 3 is composed of an insulating material, a conductive film (movable electrode) composed of copper or the like must be formed on the surface of the retaining plate 3 which faces the board 1.

Figure 16A:
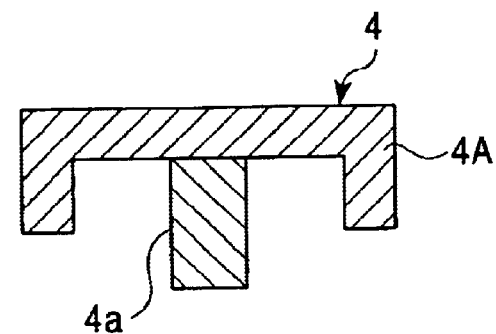
FIG. 16A is a sectional view showing a modification of a weight included in the capacitive sensor according to the present invention.

In addition, the cross sectional shape of the weight 4 is not limited to the 'T' shape, and the weight 4 may also have a shape like an umbrella, as shown in FIG. 16A. The umbrella-shaped weight 4 has a head portion 4A whose thickness is increased at the peripheral region thereof (in other words, the thickness of the head portion 4A is reduced at the central region thereof) compared to the above-described weight 4 having a 'T' shape in cross section. In this case, the gravity center of the weight 4 can be moved to a higher position without changing the height of the weight 4.

Figure 16B:
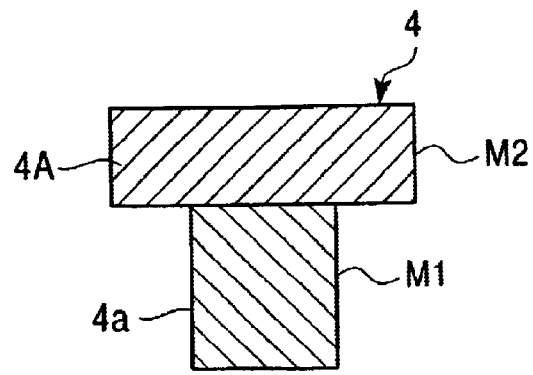
FIG. 16B is a sectional view showing another modification of the weight included in the capacitive sensor according to the present invention.

The weight 4 may of course have a simple columnar shape. In this case, the weight per unit length of the head portion 4A of the weight 4 is preferably greater than that of the bottom portion 4a. Furthermore, as shown in FIG. 16B, the bottom portion 4a and the head portion 4A of the weight 4 may also be composed of materials M1 and M2, respectively, which have different specific gravity. More specifically, a resin material having small specific gravity such as Nylon, polyacetal, polybutylene terephthalate (PBT), and acrylonitrile-butadiene-styrene (ABS) resin may be used as the material M1, and a material whose specific gravity is increased than that of the material M1 by mixing metal particles such as tungsten particles or the like into the above-described resin may be used as the material M2. Since the materials M1 and M2 are composed of a resin, the weight 4 may be easily manufactured by co-injection molding (two-color molding), and there is more freedom in designing the shape, etc., of the weight 4.

In addition, in the above-described first to third embodiments, the mounting portion 3d is prevented from being deflected toward the board 1 by the convex portion 1b which projects from the board 1 toward the mounting portion 3d, or by the projection 4b which projects from the weight 4 toward the board 1. In the present invention, either one of these structures can be selected arbitrarily.

In addition, although the tilt sensor is explained as an example of a capacitive sensor in the above-described embodiments, the present invention is not limited to tilt sensors, and may also be applied to, for example, acceleration sensors, impact sensors, etc.

What is claimed is:

1. A capacitive sensor comprising:
   a retaining member;
   an intermediate member retained by the retaining member such that the intermediate member can rotate around a first axis;
   a movable member retained by the intermediate member such that the movable member can rotate around a second axis which is perpendicular to the first axis;
   a weight provided on the movable member;
   a movable electrode unit consisting of one or more electrodes which is provided on the movable member; and
   a board on which a fixed electrode unit consisting of one or more electrodes is provided such that the fixed electrode unit faces the movable electrode unit,
   wherein at least one of the movable electrode unit and the fixed electrode unit includes a plurality of electrodes, and wherein capacitances between the one or more electrodes of the movable electrode unit and the one or more electrodes of the fixed electrode unit change in accordance with the movement of the movable member.

2. A capacitive sensor according to claim 1, wherein the retaining member and the intermediate member are connected to each other with a pair of first connecting members which extend along the first axis, wherein the intermediate member and the movable member are connected to each other with a pair of second connecting members which extend along the second axis, and wherein the retaining member, the intermediate member, the movable member, the first connecting members, and the second connecting members are integrally formed of a flexible plate.

3. A capacitive sensor according to claim 2, wherein the retaining member and the intermediate member are separated from each other with first slits which are arranged at positions excluding the positions where the first connecting members are disposed, and wherein notch portions are formed in the retaining member at both ends of the first slits.

4. A capacitive sensor according to claim 2, wherein the intermediate member and the movable member are separated from each other with second slits which are arranged at positions excluding the positions where the second connecting members are disposed; and wherein notch portions are formed in the movable member at both ends of the second slits.

5. A capacitive sensor according to claim 1, wherein the movable member is composed of a conductive material, and wherein the movable electrode unit is integrated with the movable member.

6. A capacitive sensor according to claim 2, wherein the movable member has a plurality of holes at positions close to a bonding area between the weight and the movable member in the peripheral region of the bonding area.

7. A capacitive sensor according to claim 1, further comprising gap-maintaining means which maintains a gap between the fixed electrode unit and the movable electrode unit.

8. A capacitive sensor according to claim 7, wherein the gap-maintaining means comprises a retaining projection which retains the movable member above the board such that the movable member can rotate.

9. A capacitive sensor according to claim 7, wherein the gap-maintaining means comprises a plate which surrounds the fixed electrode unit.

10. A capacitive sensor according to claim 7, wherein the gap-maintaining means comprises a conductive member through which an electric signal is supplied to the movable electrode unit.

11. A capacitive sensor according to claim 1, further comprising a conductive cover which is grounded and which covers at least the weight, the movable member, and the fixed electrode unit.

12. A capacitive sensor according to claim 11, wherein the shape of the cover is symmetric about a line which extends perpendicularly to the movable electrode unit and passes through the center of the movable electrode unit.

13. A capacitive sensor according to claim 11, further comprising a packing which is disposed between the cover and the board.

* * * * *